US009434374B2

(12) United States Patent
Chan

(10) Patent No.: US 9,434,374 B2
(45) Date of Patent: Sep. 6, 2016

(54) APPARATUS INCLUDING OPERATION-SWITCH ASSEMBLY FOR SWITCHING PROPULSION OPERATION OF VEHICLE

(71) Applicant: Che Hang Cliff Chan, Oshawa (CA)

(72) Inventor: Che Hang Cliff Chan, Oshawa (CA)

( * ) Notice: Subject to any disclaimer, the term of this patent is extended or adjusted under 35 U.S.C. 154(b) by 85 days.

(21) Appl. No.: 14/324,788

(22) Filed: Jul. 7, 2014

(65) Prior Publication Data
US 2015/0045178 A1 Feb. 12, 2015

Related U.S. Application Data

(60) Provisional application No. 61/865,007, filed on Aug. 12, 2013.

(51) Int. Cl.
*A63C 17/12* (2006.01)
*B60W 10/196* (2012.01)
(Continued)

(52) U.S. Cl.
CPC .......... *B60W 10/196* (2013.01); *A63C 17/015* (2013.01); *A63C 17/12* (2013.01); *A63C 17/265* (2013.01); *B60K 17/043* (2013.01); *B60L 7/12* (2013.01); *B60L 7/26* (2013.01); *B60L 8/003* (2013.01); *B60L 11/14* (2013.01); *B60L 11/1805* (2013.01); *B60L 11/1877* (2013.01); *B60L 15/2036* (2013.01); *B60W 10/08* (2013.01); *B62K 3/002* (2013.01); *B62K 13/00* (2013.01); *A63C 2203/12* (2013.01); *A63C 2203/18* (2013.01); *B60K 7/0007* (2013.01); *B60K 2007/0061* (2013.01); *B60L 2200/10* (2013.01); *B60L 2200/12* (2013.01); *B60L 2200/32* (2013.01); *B60L 2220/44* (2013.01); *B60L 2240/12* (2013.01); *B60L 2240/421* (2013.01); *B60L 2240/423* (2013.01); *B60L 2250/24* (2013.01); *Y02T 10/70* (2013.01); *Y02T 10/7005* (2013.01); *Y02T 10/705* (2013.01); *Y02T 10/7083* (2013.01); *Y02T 10/72* (2013.01); *Y02T 10/7275* (2013.01); *Y10T 477/24* (2015.01);
(Continued)

(58) Field of Classification Search
CPC A63C 17/12; A63C 2203/12; Y10T 477/32; B62M 6/45; B62M 6/40
See application file for complete search history.

(56) References Cited

U.S. PATENT DOCUMENTS

| 4,073,356 A | 2/1978 | Schlicht |
| 4,807,896 A | 2/1989 | Philippi |

(Continued)

FOREIGN PATENT DOCUMENTS

| EP | 2591829 | 5/2013 |
| WO | 8000823 | 5/1980 |

*Primary Examiner* — Sherry Estremsky
(74) *Attorney, Agent, or Firm* — Giuseppe Mariconda

(57) ABSTRACT

An apparatus includes a vehicle configured to support the user. The apparatus also includes an operation-switch assembly configured to be supported by the vehicle. The operation-switch assembly is also configured to switch propulsion operation of the vehicle between a first propulsion-operation mode and a second propulsion-operation mode. In the first propulsion-operation mode, the operation-switch assembly is also configured to permit propulsion of the vehicle to be influenced by a power-train assembly being configured to generate a power-train force. In the second propulsion-operation mode, the operation-switch assembly is also being configured to: (A) permit propulsion of the vehicle to be influenced by a non power-train force, and (B) permit propulsion of the vehicle to be not influenced by the power-train force of the power-train assembly.

16 Claims, 10 Drawing Sheets

(51) Int. Cl.

| | |
|---|---|
| *B60W 10/08* | (2006.01) |
| *A63C 17/01* | (2006.01) |
| *A63C 17/26* | (2006.01) |
| *B62K 3/00* | (2006.01) |
| *B62K 13/00* | (2006.01) |
| *B60K 17/04* | (2006.01) |
| *B60L 7/12* | (2006.01) |
| *B60L 7/26* | (2006.01) |
| *B60L 8/00* | (2006.01) |
| *B60L 11/14* | (2006.01) |
| *B60L 11/18* | (2006.01) |
| *B60L 15/20* | (2006.01) |
| *B60K 7/00* | (2006.01) |

(52) U.S. Cl.
CPC ......... *Y10T 477/644* (2015.01); *Y10T 477/675* (2015.01)

(56) References Cited

U.S. PATENT DOCUMENTS

| | | | | |
|---|---|---|---|---|
| 4,984,648 | A | * | 1/1991 | Strzok ............ A63C 5/08 180/181 |
| 5,016,726 | A | | 5/1991 | Metcalf |
| 5,797,466 | A | * | 8/1998 | Gendle .......... A63C 17/265 180/181 |
| 5,829,543 | A | * | 11/1998 | Diaz ............ A63C 17/12 180/15 |
| 6,007,074 | A | * | 12/1999 | Tarng ........... A63C 17/12 192/84.3 |
| 6,467,560 | B1 | | 10/2002 | Anderson |
| 6,848,527 | B2 | * | 2/2005 | Nelson .......... A63C 17/004 180/180 |
| 7,104,351 | B2 | | 9/2006 | Robbins |
| 7,641,583 | B2 | | 1/2010 | Houle et al. |
| 2006/0032682 | A1 | | 2/2006 | Hillman et al. |
| 2006/0049595 | A1 | | 3/2006 | Crigler et al. |

* cited by examiner

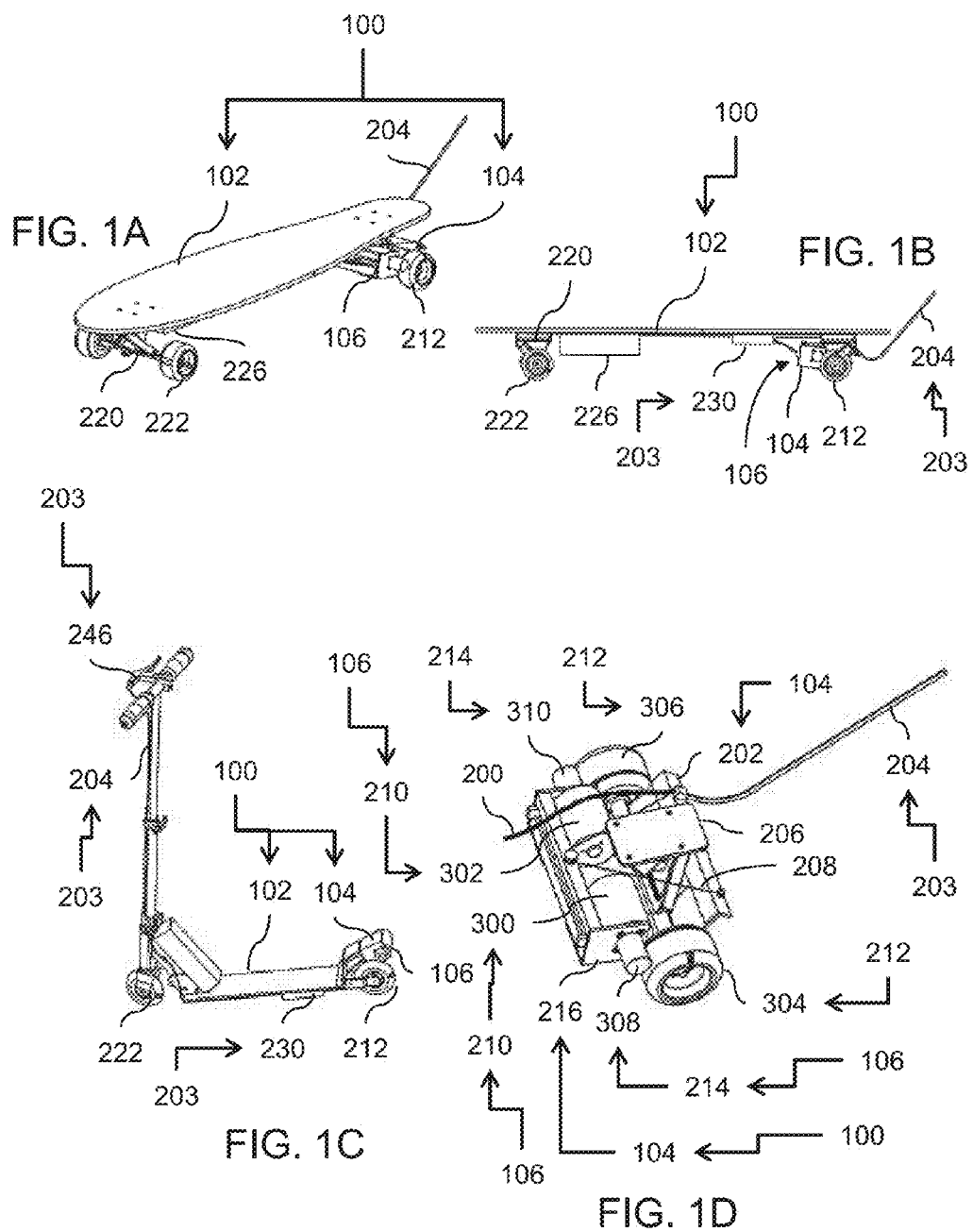

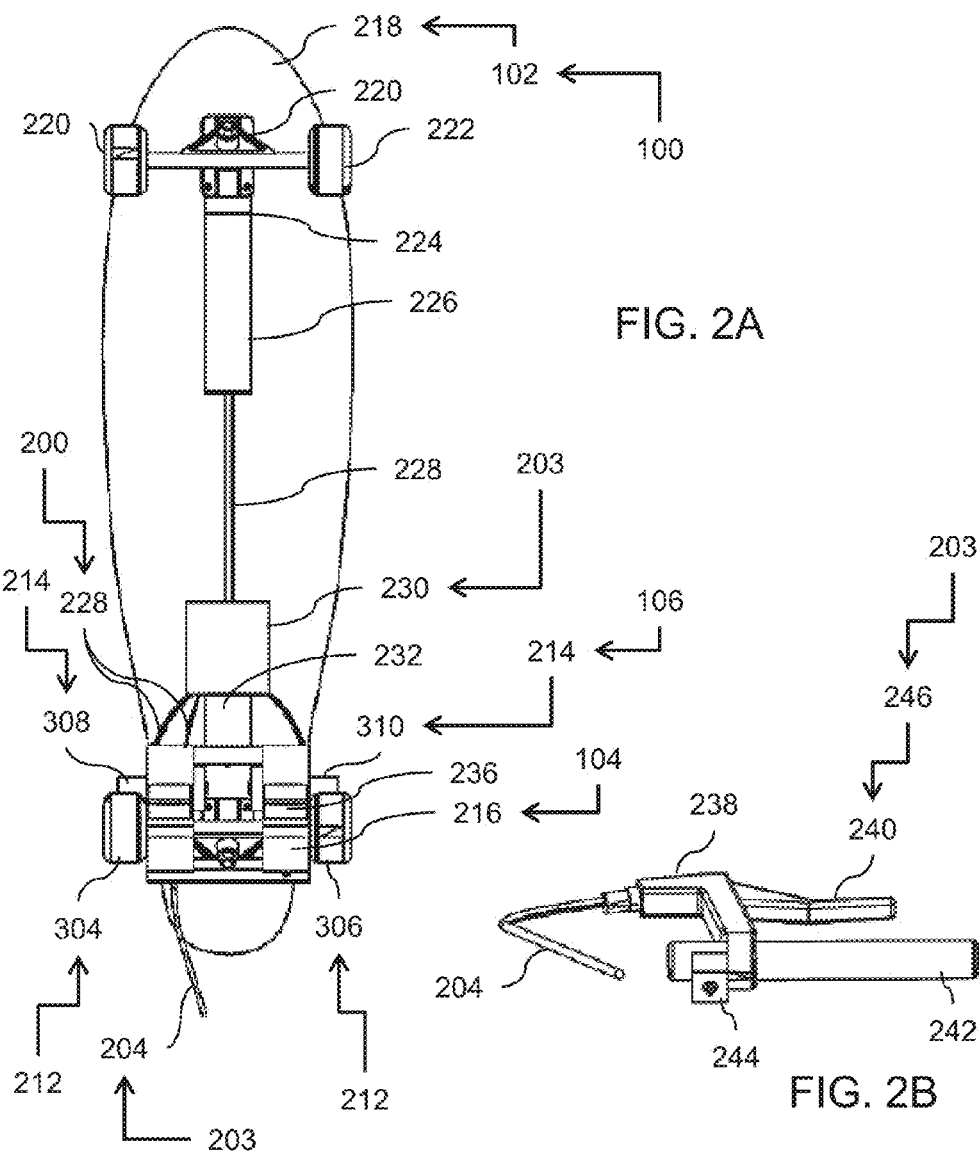

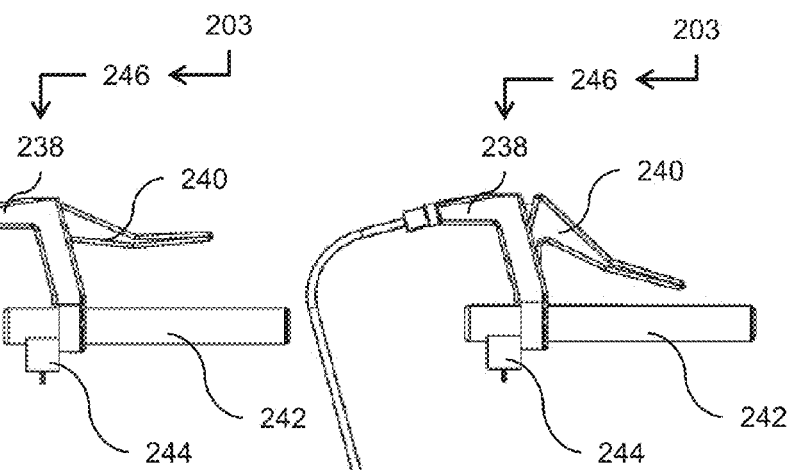
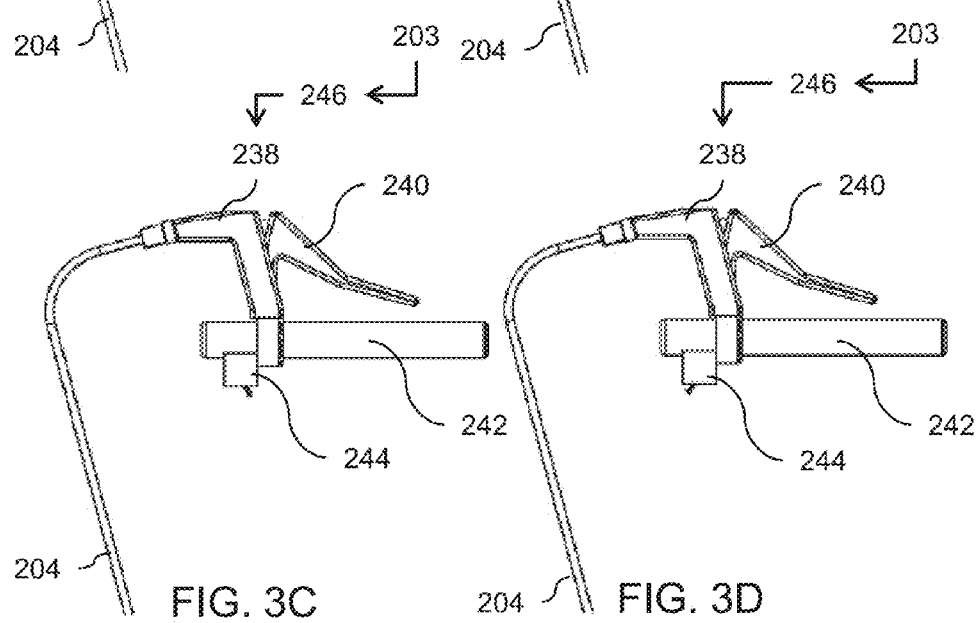

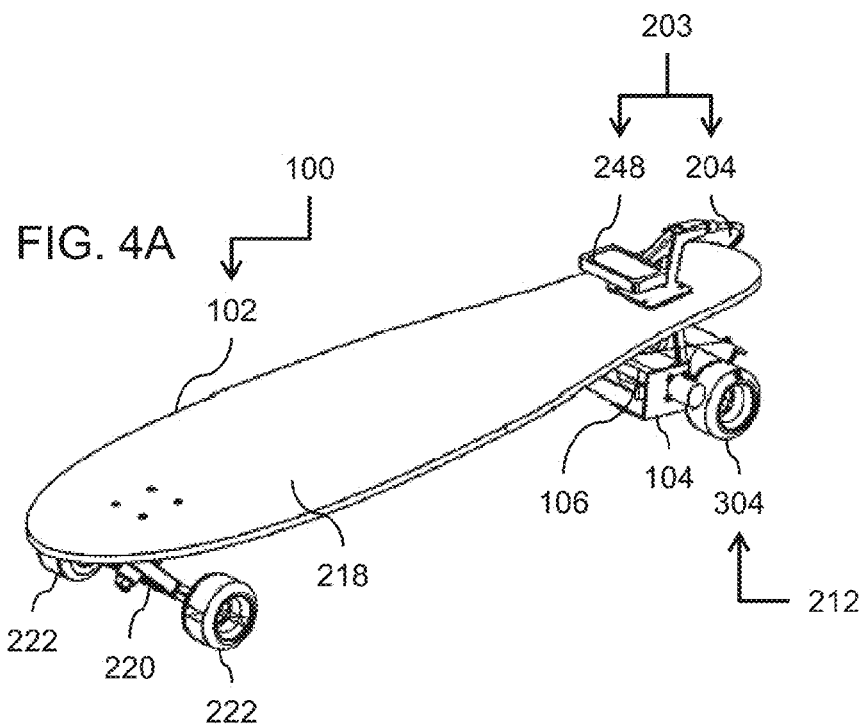
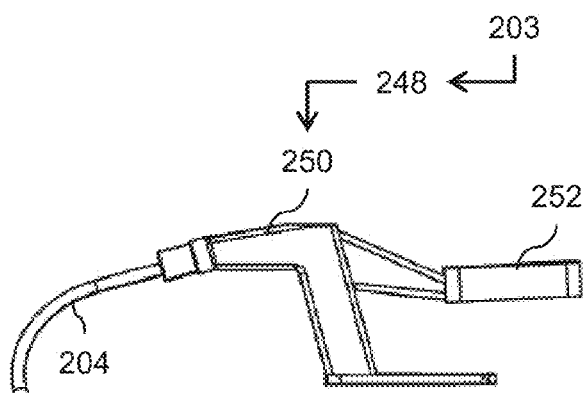
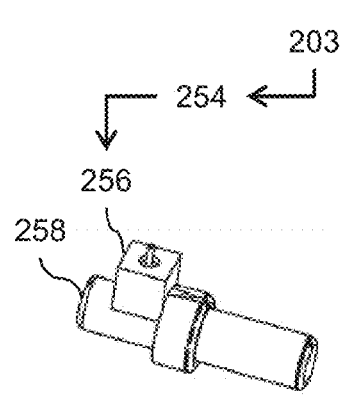
FIG. 4A
FIG. 4B
FIG. 4C

500  FIG. 5A
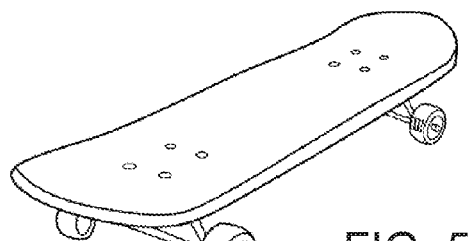
FIG. 5B
502
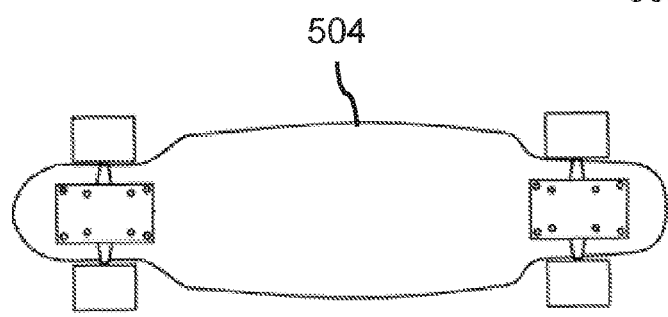
504
FIG. 5C
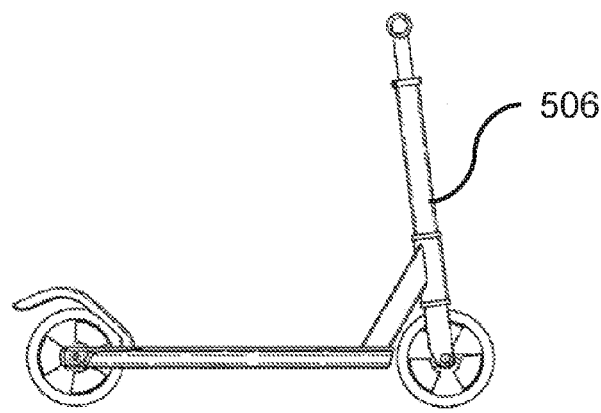
506
FIG. 5D

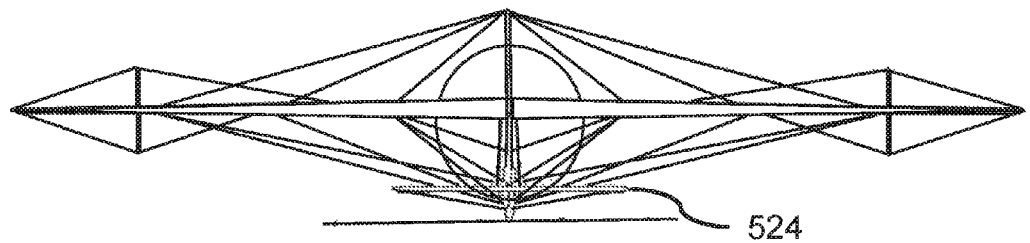
FIG. 5M
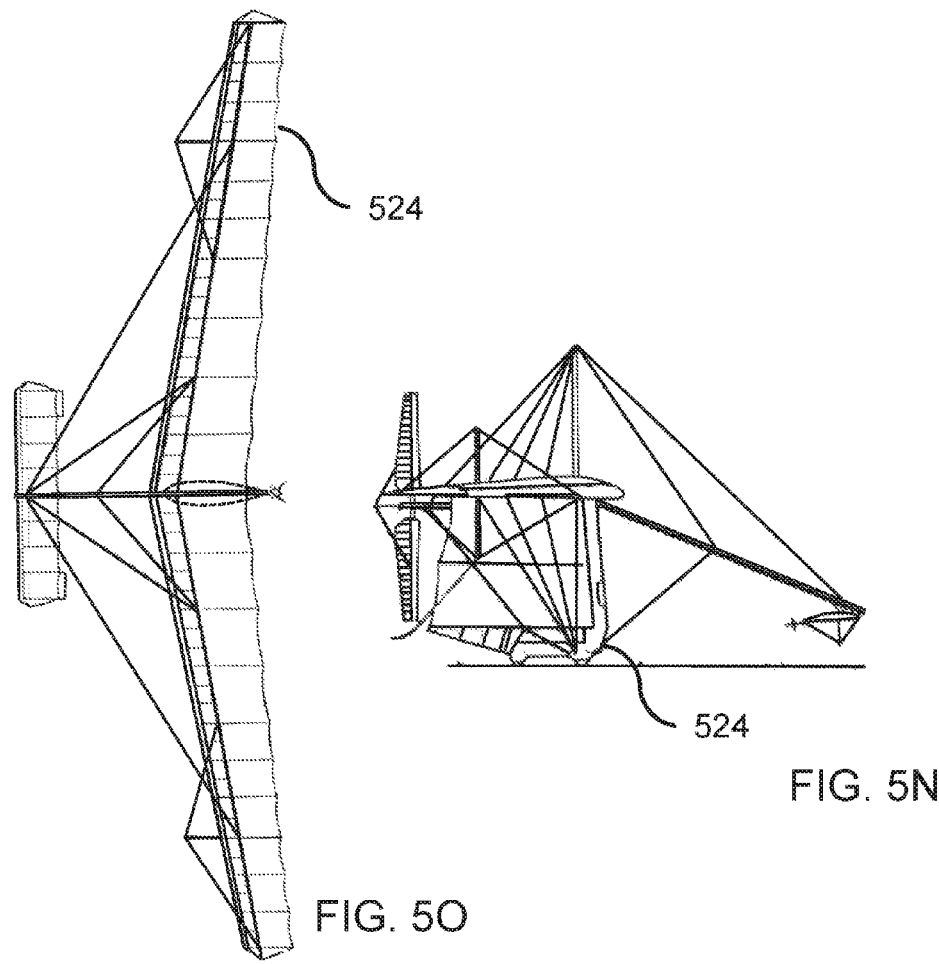
FIG. 5N
FIG. 5O

APPARATUS INCLUDING OPERATION-SWITCH ASSEMBLY FOR SWITCHING PROPULSION OPERATION OF VEHICLE

TECHNICAL FIELD

Aspects generally relate to (and are not limited to) an apparatus for use in a vehicle configured to support a user, and having an operation-switch assembly configured to switch propulsion operation of the vehicle between a first propulsion-operation mode and a second propulsion-operation mode.

BACKGROUND

Human-powered transport is the transport of person(s) and/or goods using human muscle power. Like animal-powered transport, human-powered transport has existed since time immemorial in the form of walking, running and swimming. Modern technology has allowed machines to enhance human-power. Although motorization has increased speed and load capacity, many forms of human-powered transport remain popular for reasons of lower cost, leisure, physical exercise and environmentalism.

There are many types of human-powered vehicles (whether by land, water, or air). Skateboards and/or long-boards (which are a longer variant of skateboards) have the advantage of being so small and light that users can easily carry them when not skating. An electric skateboard or a longboard is typically a modified skateboard or a modified longboard that is propelled by an electric engine, the thrust of which is usually controlled with a controller, which may operate in a wired control mode or a wireless control mode. As with a regular skateboard, it is steered by the rider shifting his or her weight. The bicycle is the most popular human-powered vehicle. Velomobiles and cabin cycles are increasingly popular in colder and/or wetter countries due to the protection they offer against the environment. Freight bicycles are used as low-cost, zero-emission vehicles to haul cargo. Cycle rickshaws can be used as taxicabs.

SUMMARY

I, the inventor, have researched a problem associated with human-powered vehicles. After much study, I believe I have arrived at an understanding of the problem and its solution, which are stated below.

Known drive systems of vehicles (of human-powered vehicles) are always permanently engaged or coupled to their drive wheels which makes free-wheeling (which is especially useful in cruising mode) impossible. Such a configuration makes driving of vehicles energy inefficient and free-wheeling not possible.

In order to mitigate, at least in part, the problems identified above, in accordance with an aspect of my work, I (the inventor) have developed an apparatus for a user which is disclosed herein. The apparatus includes a vehicle configured to support the user. The apparatus also includes an operation-switch assembly configured to be supported by the vehicle. The operation-switch assembly is also configured to switch propulsion operation of the vehicle between a first propulsion-operation mode and a second propulsion-operation mode. In the first propulsion-operation mode, the operation-switch assembly is also configured to permit propulsion of the vehicle to be influenced by a power-train assembly being configured to generate a power-train force. In the second propulsion-operation mode, the operation-switch assembly is also being configured to: (A) permit propulsion of the vehicle to be influenced by a non power-train force, and (B) permit propulsion of the vehicle to be not influenced by the power-train force of the power-train assembly.

In order to mitigate, at least in part, the problems identified above, in accordance with another aspect of my work, I (the inventor) have developed an apparatus for a user and for a vehicle. The apparatus is configured to support the user. The apparatus includes an operation-switch assembly configured to be supported by the vehicle. The operation-switch assembly is also configured to switch propulsion operation of the vehicle between a first propulsion-operation mode and a second propulsion-operation mode. In the first propulsion-operation mode, the operation-switch assembly is also configured to permit propulsion of the vehicle to be influenced by a power-train assembly being configured to generate a power-train force. In the second propulsion-operation mode, the operation-switch assembly is also configured to: (A) permit propulsion of the vehicle to be influenced by a non power-train force, and (B) permit propulsion of the vehicle to be not influenced by the power-train force of the power-train assembly.

In order to mitigate, at least in part, the problems identified above, in accordance with another aspect of my work, I (the inventor) have developed an apparatus for a user. The apparatus includes a vehicle configured to support the user. The apparatus also includes a power-train assembly supported by the vehicle. The apparatus also includes an operation-switch assembly configured to be supported by the vehicle. The operation-switch assembly is also configured to switch propulsion operation of the vehicle between a first propulsion-operation mode and a second propulsion-operation mode. In the first propulsion-operation mode, the operation-switch assembly is also configured to permit propulsion of the vehicle to be influenced by the power-train assembly configured to generate a power-train force. In the second propulsion-operation mode, the operation-switch assembly is also configured to: (A) permit propulsion of the vehicle to be influenced by a non power-train force, and (B) permit propulsion of the vehicle to be not influenced by the power-train force of the power-train assembly.

In order to mitigate, at least in part, the problems identified above, in accordance with another aspect of my work, I (the inventor) have developed an apparatus for a user; the apparatus includes: a power-train assembly configured to be supported by a vehicle; the vehicle is configured to support the user; an operation-switch assembly is configured to be supported by the vehicle; the operation-switch assembly is also configured to switch propulsion operation of the vehicle between a first propulsion-operation mode and a second propulsion-operation mode; in the first propulsion-operation mode, the operation-switch assembly is also configured to permit propulsion of the vehicle to be influenced by the power-train assembly configured to generate a power-train force; and in the second propulsion-operation mode, the operation-switch assembly is also configured to: (A) permit propulsion of the vehicle to be influenced by a non power-train force; and (B) permit propulsion of the vehicle to be not influenced by the power-train force of the power-train assembly.

In order to mitigate, at least in part, the problems identified above, in accordance with other aspects of my work, I (the inventor) have developed and provided other aspects as provided in the claims.

Other aspects and features of the non-limiting embodiments may now become apparent to those skilled in the art upon review of the following detailed description of the non-limiting embodiments with the accompanying drawings.

BRIEF DESCRIPTION OF DRAWINGS

The non-limiting embodiments may be more fully appreciated by reference to the following detailed description of the non-limiting embodiments when taken in conjunction with the accompanying drawings, in which:

FIG. 1A depicts a perspective view of an example of an apparatus having an operation-switch assembly.

FIG. 1B depicts a side view of an example of the apparatus of FIG. 1A

FIG. 1C depicts a perspective view of another example of an apparatus having an operation-switch assembly.

FIG. 1D depicts a perspective view of an example of the operation-switch assembly of FIG. 1A.

FIG. 2A depicts a bottom view of an example of the apparatus of FIG. 1A;

FIG. 2B depicts a perspective view of an example of a control assembly for use with the apparatus of FIG. 2A;

FIGS. 3A-3D depict side views of examples of a control assembly for use with the apparatus of FIG. 1A;

FIG. 4A depicts a perspective view of another example of a control assembly for use with the apparatus of FIG. 1A;

FIG. 4B depicts a side view of an example of the control assembly of FIG. 4A;

FIG. 4C depicts a perspective close-up view of an example of the control assembly of FIG. 4A.

Figure 1E:
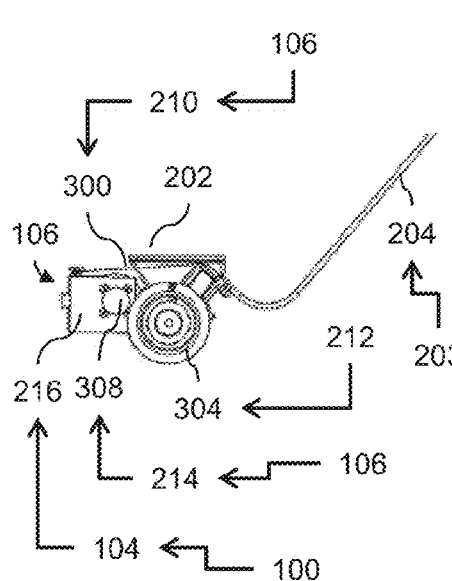
FIG. 1E depicts a side view of an example of the operation-switch assembly of FIG. 1A in a second propulsion-operation mode.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. In addition, common, but well-understood, elements that are useful or necessary in commercially feasible embodiment are often not depicted in order to facilitate a less obstructed view of these various embodiments of the present disclosure.

LISTING OF REFERENCE NUMERALS USED IN THE DRAWINGS 100 apparatus
102 vehicle
104 operation-switch assembly
106 power-train assembly
200 controller signal cable
202 motor-mount frame assembly
203 control assembly
204 control-cable assembly
206 truck assembly
208 control cable
210 engine
212 wheel assembly
214 friction-gear assembly
216 frame assembly
218 platform
220 front truck assembly
222 front wheel
224 battery-support assembly
226 battery assembly
228 electric-cable assembly
230 speed controller
232 controller-support assembly
236 self-retaining track-movement fixture
238 lever support fixture
240 controller lever
242 controller handle bar
244 joy-stick assembly
246 hand-control assembly
248 foot-control assembly
250 controller lever support fixture
252 foot-controller lever
254 wireless joy-stick device
256 joy-stick assembly
258 controller handle
300 first electric motor
302 second electric motor
304 first wheel assembly
306 second wheel assembly
308 first friction gear
310 second friction gear
500 roller skate
502 skateboard
504 longboard
506 kick scooter
508 bicycle
510 rickshaw
512 side-by-side tandem cycle
514 tricycle
516 quadracycle
518 tandem cycle
520 peddle-driven car
522 peddle-driven car
524 peddle-driven aircraft
526 peddle-driven water craft
528 peddle-driven water craft

DETAILED DESCRIPTION OF THE NON-LIMITING EMBODIMENT(S)

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear,"

"right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise. It is understood that "at least one" is equivalent to "a".

FIG. 1A depicts a perspective view of an example of an apparatus 100 having an operation-switch assembly 104. The apparatus 100 is for a user. It is understood the apparatus 100 does not include the user. That is, to make a case of infringement, the user is not present. The user is mentioned so that the apparatus 100 may be better understood.

In accordance with the example of FIG. 1A, the following are depicted: the apparatus 100, the vehicle 102, the operation-switch assembly 104, a power-train assembly 106, a control-cable assembly 204, a wheel assembly 212, a front truck assembly 220, a front wheel 222, and a battery assembly 226. The control-cable assembly 204 may include a controller signal cable and a Bowden-type cable or an actuator, or may include only a Bowden-type cable or an actuator for the case of using the wireless joy-stick device 254 (if so desired). The apparatus 100 includes (in accordance with an option) the vehicle 102 and the operation-switch assembly 104 and the power-train assembly 106 as a combination. The control-cable assembly 204 is configured to control the operation of the power-train assembly 106. The vehicle 102 includes a wheel assembly 212 configured to permit rolling movement of the vehicle 102. The front truck assembly 220 is mounted to the bottom portion of the vehicle 102. The front truck assembly 220 includes a front wheel 222. The battery assembly 226 is mounted to the bottom portion of the vehicle 102. The control-cable assembly 204 may include a Bowden-type cable or an actuator and a controller signal cable or may include only a Bowden-type cable or an actuator for the case of using the wireless joy-stick device 254 (if so desired).

It will be appreciated that the power-train assembly 106 may provide at least one or more instances of an engine, a motor, an electric motor, or a combustion engine, etc., and any required assemblies (such as a friction-gear assembly 214 of FIG. 1D, etc.). For instance, the example of the apparatus 100 depicted in FIG. 2A shows two instances of an electric motor.

In accordance with a general option, the apparatus 100 includes (and is not limited to) a combination of a vehicle 102 and an operation-switch assembly 104. The vehicle 102 is configured to support the user. The operation-switch assembly 104 is configured to be supported by the vehicle 102. The operation-switch assembly 104 is also configured to switch propulsion operation of the vehicle 102 between a first propulsion-operation mode and a second propulsion-operation mode. In the first propulsion-operation mode, the operation-switch assembly 104 is also configured to permit propulsion of the vehicle 102 to be influenced by a power-train assembly 106 configured to generate a power-train force. The power-train assembly 106 may be mounted to the operation-switch assembly 104 or may be supported by the vehicle 102. In accordance with this option, the combination of the vehicle 102 and the operation-switch assembly 104 are provided to the user, and the user installs the power-train assembly 106 to the vehicle 102. It will be appreciated that the combination of the vehicle 102 and the operation-switch assembly 104 may be provided to a user or to a vendor that, in the latter case, installs the power-train assembly 106 to the vehicle 102 and then provides the vehicle 102 to the user. In the second propulsion-operation mode, the operation-switch assembly 104 is also configured to: (A) permit propulsion of the vehicle 102 to be influenced by a non power-train force, and (B) permit propulsion of the vehicle 102 to be not influenced by the power-train force of the power-train assembly 106. It will be appreciated that examples of the non power-train force may include a user-motive force generated by the user, and/or any other force (such as a force provided by an animal) or a force field (such as gravity). The user-motive force is a force generated by the user. The operation-switch assembly 104 may be called a clutch assembly.

By way of example, the operation-switch assembly 104 may be called a controllable clutch (or clutches) or clutch-like mechanism(s). The operation-switch assembly 104 is configured to: (A) engage and disengage driving wheel(s) from a power-train assembly 106 to allow complete free-wheeling; (B) control the amount of torque transferred to the driving wheel(s) as a way of traction and/or supplementary speed control; and (C) control the amount of dynamic braking force applied to the driving wheel(s). The operation-switch assembly 104 may include a controllable clutch (or clutches) or clutch-like mechanism(s). The operation-switch assembly 104 may include friction wheels, gears, abrasive materials, elastic materials, belts, chains, magnets, self-sticking and/or adhesive materials to transfer or separate power from the power-train assembly 106 to the driving wheel(s) as well as (if so desired) to provide dynamic braking to the driving wheel(s). The operation-switch assembly 104 may be provided as an item to be installed on existing skateboards and other types of vehicles without modification (or with minimal modification) of the vehicle 102. Variations of the operation-switch assembly 104 may be used to power personal vehicles such as, but not limited to longboards, roller skates, scooters, bicycles, tricycles, rickshaws, etc.

By way of example, the vehicle 102 includes any one of a kick scooter, a skateboard, a longboard, a cycle, a bicycle, a tricycle, a rickshaw, a roller skate, a peddle-driven car, a peddle-driven above water-level or below water-level watercraft, a peddle-driven aircraft. In accordance with the example of FIG. 1A, the vehicle 102 includes (or is) a skateboard.

By way of example, the power-train assembly 106 includes any one of an electric motor, a combustion engine, and/or a hybrid motor or engine. The power-train assembly 106 includes a group of components that are configured to generate power and to deliver the power to the surface (road, water, or air). The power-train assembly 106 may or may not include the motor (engine), transmission, drive shafts, differentials, and the final drive (drive wheels, continuous track as in tanks or tractors, propeller, etc.). The power-train assembly 106 may include the motor/engine and transmission, including the other components if they are integral to the transmission. Generally, the power-train assembly 106 includes components used to transform stored energy (in the form of chemical, solar, nuclear, kinetic, potential, etc.) into kinetic energy for propulsion purposes. This includes the utilization of multiple power sources and non-wheel-based vehicles.

In accordance with another general option, the apparatus 100 includes (and is not limited to) the operation-switch assembly 104. In accordance with this option, the operation-switch assembly 104 is provided to the user, and the user installs the operation-switch assembly 104 to the vehicle 102 that has the power-train assembly 106. This may be called (or referred to as) retrofit options where existing instances of vehicles may be converted by merely installing the operation-switch assembly 104 to the vehicle 102. It will be appreciated that the operation-switch assembly 104 may be provided to a user or a vendor that, in the latter case, installs the operation-switch assembly 104 to the vehicle 102 and then provides the vehicle 102 to the user.

In accordance with a general option, the apparatus 100 includes the combination of the power-train assembly 106 and the operation-switch assembly 104. The vendor supplies this combination to the user that may already have the vehicle 102.

In accordance with yet another general option, the apparatus 100 includes (and is not limited to) a combination of the vehicle 102, the operation-switch assembly 104 and the power-train assembly 106. In accordance with this option, the combination of the vehicle 102, the operation-switch assembly 104 and the power-train assembly 106 is provided to the user and there is nothing more for the user to do but to enjoy the combination.

A technical effect of the apparatus 100 is that in the second propulsion-operation mode, the vehicle 102 has not lost any speed on account of any retarding force from the power-train assembly 106 since the retarding force does not reach the vehicle 102 thus in this way energy is saved by not having to re-engage the power-train assembly 106 as often. A desired speed of the vehicle 102 may be reached by application of the power-train assembly 106 or by a user-motive force generated by the user or any force such as a force provided by an animal and/or by a force field such as gravity, and then the vehicle 102 is allowed to coast and maintain its vehicular momentum without influence from the power-train assembly 106. This way, the vehicle 102 may coast and maintain its vehicular momentum and avoid any possibility of any influence of braking or friction or inertia from the power-train assembly 106.

In accordance with an option, the operation-switch assembly 104 is also configured in such a way that in the second propulsion-operation mode, the power-train force of the power-train assembly 106 does not propel the vehicle 102, and the vehicle 102 does not experience a retarding force from the power-train assembly 106 so that a speed of the vehicle 102 is not negatively impacted by the power-train assembly 106.

In accordance with an option, the operation-switch assembly 104 is also configured in such a way that in the second propulsion-operation mode, the power-train force of the power-train assembly 106 does not propel the vehicle 102 but remains active and ready for immediate and available use on standby mode when (or until) required once the operation-switch assembly 104 switches operation of the vehicle 102 to the first propulsion-operation mode.

In accordance with an option, the initial state of the operation-switch assembly 104 may be configured to exist in either one of: (A) the first propulsion-operation mode (similar to the clutch of an automobile), and (B) the second propulsion-operation mode (not similar to the clutch of the automobile).

For example, activation of the controller lever 240 (i.e., squeezed to activate) then causes the operation-switch assembly 104 to operate in the first propulsion-operation mode (that is, the friction-gear assembly 214, of FIG. 1D, is engaged with the power-train assembly 106 to provide propulsion to the vehicle 102).

For example, deactivation of the controller lever 240 (i.e., released to deactivate) then causes the operation-switch assembly 104 to operate in the second propulsion-operation mode (that is, freewheeling is allowed).

For example, when the controller lever 240 is activated (squeezed), the vehicle 102 is placed in the second propulsion-operation mode, and the friction-gear assembly 214 does not receive propulsion from the power-train assembly 106. When the controller lever 240 is deactivated (lever released), the friction-gear assembly 214 engages with the power-train assembly 106 (so that the vehicle 102 may be propelled).

In accordance with an option, the operation-switch assembly 104 is also configured in such a way that the vehicle 102 operates in the second propulsion-operation mode in which the vehicle 102 is operated in any one of the following cases in which the vehicle 102 is: (A) propelled in response to application of the non power-train force, and (B) maintained its vehicular momentum with a desired speed.

In accordance with an option, the operation-switch assembly 104 is also configured in such a way that the vehicle 102 operates in the first propulsion-operation mode in which the vehicle 102 is propelled in response to application of the power-train force generated by the power-train assembly 106.

FIG. 1B depicts a side view of an example of the apparatus 100 of FIG. 1A.

In accordance with an option, the apparatus 100 further includes a wheel assembly 212. The wheel assembly 212 is configured to operatively couple to the vehicle 102 in such a way that the wheel assembly 212 transmits a torque force that facilitates rolling movement of the vehicle 102 relative to a surface. The wheel assembly 212 is configured to operatively engage the surface, such as the ground.

In accordance with an option, in the first propulsion-operation mode, the power-train force is transmittable to a wheel assembly 212 in such a way that the vehicle 102 is propelled by application of the power-train force generated by the power-train assembly 106. In the second propulsion-operation mode, only the non power-train force is transmittable to the wheel assembly 212 in such a way that the vehicle 102 is propelled by the non power-train force. The non power-train force may be transmittable to the wheel assembly 212 by way of contact friction either via a torque transfer or by other force transfer.

In accordance with an option, in the second propulsion-operation mode, the operation-switch assembly 104 is configured to not permit the power-train assembly 106 to: (A) increase propulsion of the vehicle 102, and (B) decrease the propulsion of the vehicle 102.

In accordance with an option, in an acceleration operation of the power-train assembly 106, the power-train assembly 106 is configured to apply any one of: (A) a full application of the power-train force being configured to any one of increase and maintain propulsion of the vehicle 102; and (B) a partial application of the power-train force being configured to any one of increase and maintain the propulsion of the vehicle 102.

In accordance with an option, in a braking operation of the power-train assembly 106, the power-train assembly 106 is configured to apply a power-train braking force being configured to reduce the speed of the vehicle 102 by application of any one of: (A) a full application of the power-train braking force being configured to reduce the speed of the vehicle 102, and (B) a partial application of the power-train braking force being configured to reduce the speed of the vehicle 102. The power-train braking force may also be called a friction force or dynamic braking. If braking or friction is required, then the power-train assembly 106 is permitted to influence the speed of the vehicle 102. Inertia of the power-train assembly 106 slows down the speed of the vehicle 102. Back-EMF (electromotive force) generated by the speed controller 230 of an electric motor or the compression stroke of a combustion engine slows down the speed of the vehicle 102.

In accordance with an option, in the first propulsion-operation mode, the power-train assembly 106 is operatively engaged with a wheel assembly 212 in such a way that the vehicle 102 is propelled in response to the power-train assembly 106 transferring the power-train force to the wheel assembly 212, and the vehicle 102 is propelled by the power-train force. In the second propulsion-operation mode, the power-train assembly 106 is operatively disengaged from the wheel assembly 212 in such a way that the power-train force is not received by the wheel assembly 212 from the power-train assembly 106, and the vehicle 102 is operated in any one case in which the vehicle 102 is: (A) propelled by the non power-train force, and (B) maintained at a desired speed by way of vehicular momentum associated with the vehicle 102. The non power-train force includes vehicular momentum or any force such as a force provided by an animal or by a force field such as gravity.

In accordance with an option, the operation-switch assembly 104 includes a control assembly 203 configured to actuate operation of the operation-switch assembly 104. The control assembly 203 includes a user-operated control device including any one of a hand-control assembly 246 and a foot-control assembly 248.

In accordance with the example of FIG. 1B, the following are depicted: the apparatus 100, the vehicle 102, the operation-switch assembly 104, the power-train assembly 106, the control assembly 203, the control-cable assembly 204, the wheel assembly 212, the front truck assembly 220, the front wheel 222, the battery assembly 226, and the speed controller 230. The battery assembly 226 is used for the case where the power-train assembly 106 includes an electric motor. The speed controller 230 is configured to control operation of the power-train assembly 106 (especially so if the power-train assembly 106 includes the electric motor).

FIG. 1C depicts a perspective view of another example of an apparatus 100 having an operation-switch assembly 104. In accordance with the example of FIG. 1C, the vehicle 102 includes (or is) a scooter.

In accordance with an option, in the first propulsion-operation mode, the vehicle 102 is propelled by application of the power-train force generated by the power-train assembly 106. In the second propulsion-operation mode, the vehicle 102 is propelled by application of user-motive force generated by the user. The non power-train force may include any one of the user-motive force generated by the user and/or any force such as a force provided by an animal (horse, etc.) or a force field such as gravity.

In accordance with an option, in the second propulsion-operation mode, the operation-switch assembly 104 is also configured to permit the vehicle 102 to freewheel. In the first propulsion-operation mode, the operation-switch assembly 104 is also configured to permit the vehicle 102 to not freewheel.

In accordance with the example of FIG. 1C, the following are depicted: the apparatus 100, the vehicle 102, the operation-switch assembly 104, the power-train assembly 106, the control assembly 203, the control-cable assembly 204, the wheel assembly 212, the front wheel 222, the speed controller 230, and the hand-control assembly 246. The control-cable assembly 204 connects the hand-control assembly 246 to the speed controller 230.

FIG. 1D depicts a perspective view of an example of the operation-switch assembly 104 of FIG. 1A. In accordance with an option, the operation-switch assembly 104 is also configured to (in the first propulsion-operation mode) engage the power-train assembly 106 in such a way that propulsion of the vehicle 102 is influenced by the power-train assembly 106. The operation-switch assembly 104 is also configured to (in the second propulsion-operation mode) disengage the power-train assembly 106 in such a way that propulsion of the vehicle 102 is not influenced by the power-train force of the power-train assembly 106.

In accordance with an option, the operation-switch assembly 104 includes a friction-gear assembly 214 configured to operatively couple to the power-train assembly 106 in such a way that the power-train assembly 106 rotates the friction-gear assembly 214 once operated to do just so. The operation-switch assembly 104 also includes a frame assembly 216 configured to operatively support rotation of the friction-gear assembly 214. The frame assembly 216 is configured to switchably move the friction-gear assembly 214 between the first propulsion-operation mode and the second propulsion-operation mode. The operation-switch assembly 104 also includes a control assembly 203 configured to couple to the frame assembly 216. The control assembly 203 is also configured to actuate movement of the frame assembly 216 in such a way that: (A) in the second propulsion-operation mode, the friction-gear assembly 214 does not operatively transmit the power-train force from the power-train assembly 106, and (B) in the first propulsion-operation mode, the friction-gear assembly 214 operatively transmits the power-train force from the power-train assembly 106. In the second propulsion-operation mode, the friction-gear assembly 214 becomes spaced apart from wheel assembly 212. The frame assembly 216 is configured to switchably move (linearly slide or pivotally move) the friction-gear assembly 214 between the first propulsion-operation mode and the second propulsion-operation mode. In the second propulsion-operation mode, the friction-gear assembly 214 does not operatively transmit the power-train force from the power-train assembly 106 by not contacting the wheel assembly 212. In the first propulsion-operation mode, the friction-gear assembly 214 operatively transmits the power-train force from the power-train assembly 106 by contacting the wheel assembly 212.

With reference to both FIGS. 1D and 2A, in accordance with an option, the wheel assembly 212 includes a first wheel assembly 304, and a second wheel assembly 306 spaced apart from the first wheel assembly 304. The friction-gear assembly 214 includes a first friction gear 308, and a second friction gear 310 spaced apart from the first friction gear 308. The power-train assembly 106 includes a first electric motor 300 and a second electric motor 302. The first electric motor 300 is configured to drive the first wheel assembly 304 via the first friction gear 308. The second electric motor 302 is spaced apart from the first electric motor 300. The second electric motor 302 is configured to drive the second wheel assembly 306 via the second friction gear 310. The vehicle 102 is configured to support the power-train assembly 106 configured to generate the power-train force.

In accordance with the example of FIG. 1D, the following are depicted: the apparatus 100, the operation-switch assembly 104, the power-train assembly 106, the controller signal cable 200, the motor-mount frame assembly 202, the control assembly 203, the control-cable assembly 204, the engine 210, a first electric motor 300, a second electric motor 302, the wheel assembly 212, a first wheel assembly 304, a second wheel assembly 306, a friction-gear assembly 214, a first friction gear 308, a second friction gear 310, the control cable 208, a frame assembly 216, and a truck assembly 206. For the example of FIG. 1D, the engine 210 includes the first electric motor 300 and also includes the second electric motor 302. The wheel assembly 212 includes the first wheel assembly 304 and also includes the second wheel assembly 306. The friction-gear assembly 214 includes the first friction gear 308 and also includes the second friction gear 310. The frame assembly 216 is configured to support various components, such as the engine 210 and the friction-gear assembly 214. The truck assembly 206 is configured to support the wheel assembly 212 and the motor-mount frame assembly 202. The truck assembly 206 is configured to be fixedly connected, by way of fasteners (or welds or adhesives), to the bottom portion of the vehicle 102 so that when installed the truck assembly 206 faces the ground when the vehicle 102 is made to operate.

Figure 1F:
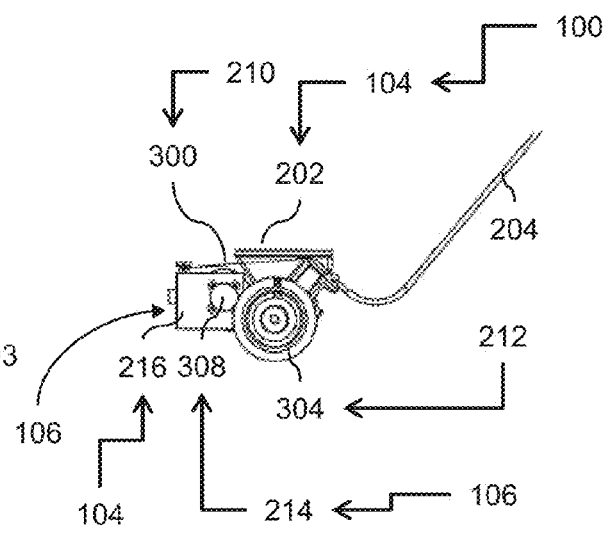
FIG. 1F depicts another side view of an example of the operation-switch assembly of FIG. 1A in a first propulsion-operation mode.
Figure 5E:
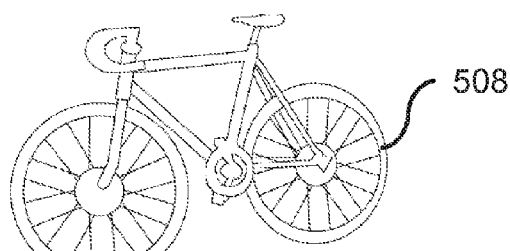
FIGS. 5A to 5R depict views of examples of types of transportation systems adapted for use with the apparatus of FIG. 1A.
Figure 5F:
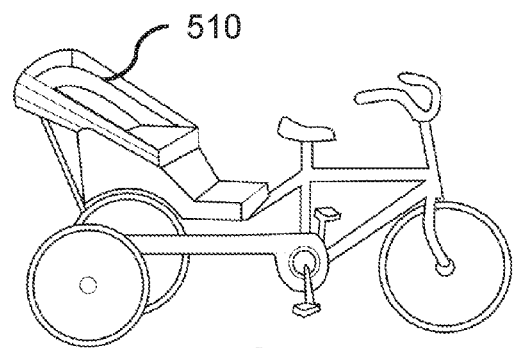
Figure 5G:
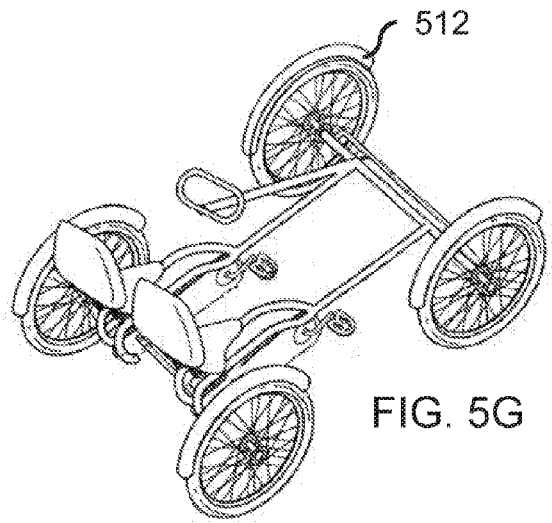
Figure 5H:
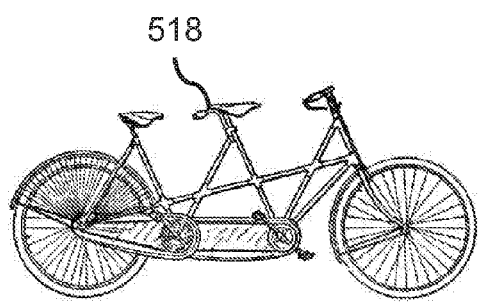
Figure 5I:
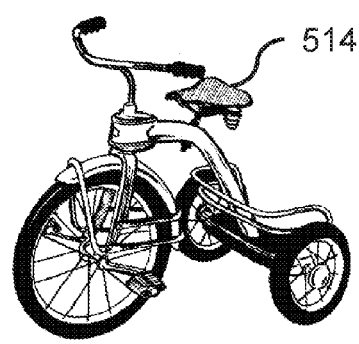
Figure 5J:
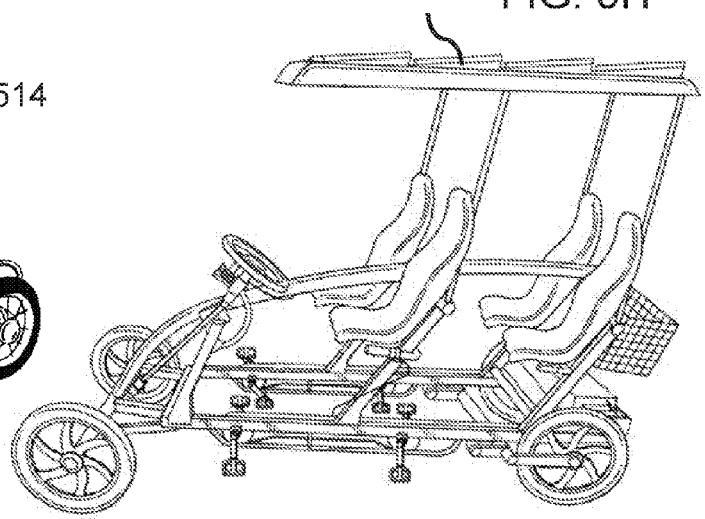
Figure 5K:
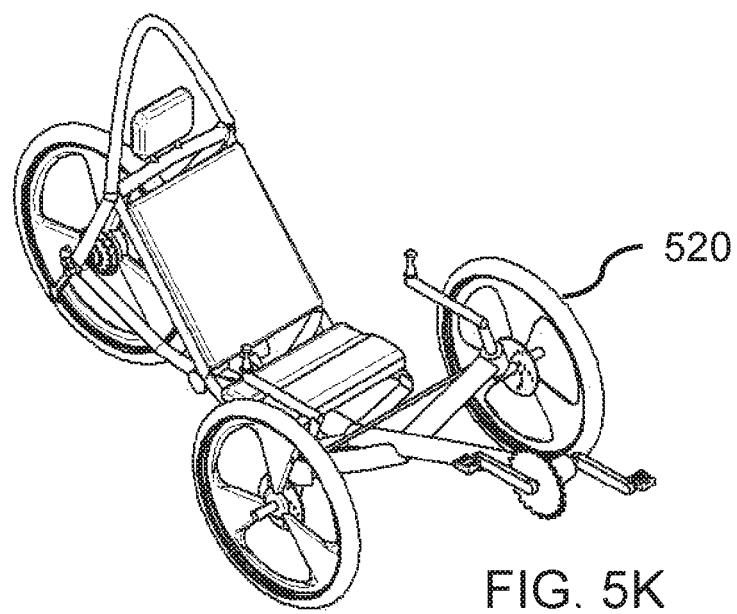
Figure 5L:
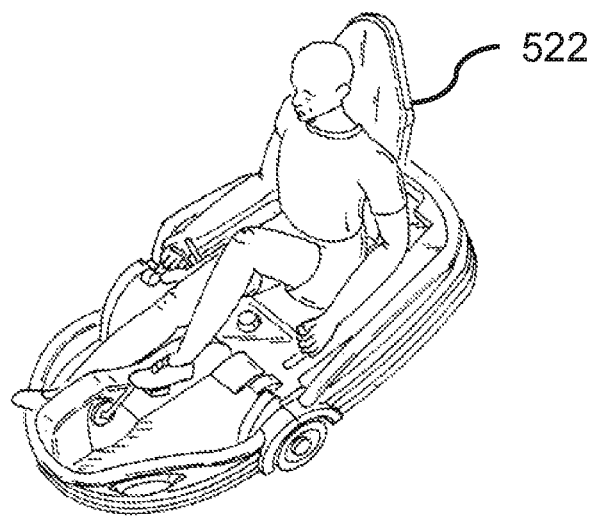
Figure 5P:
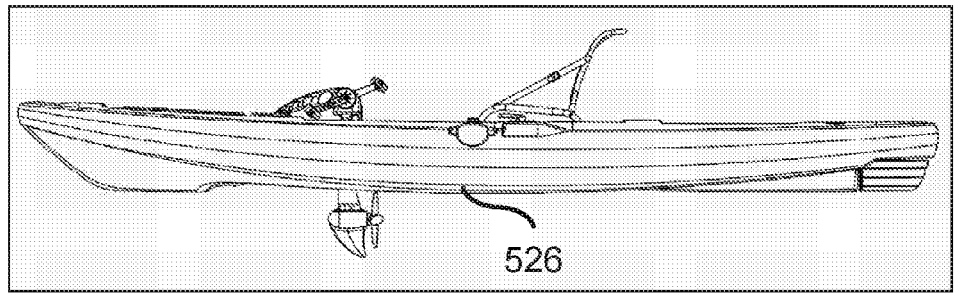
Figure 5Q:
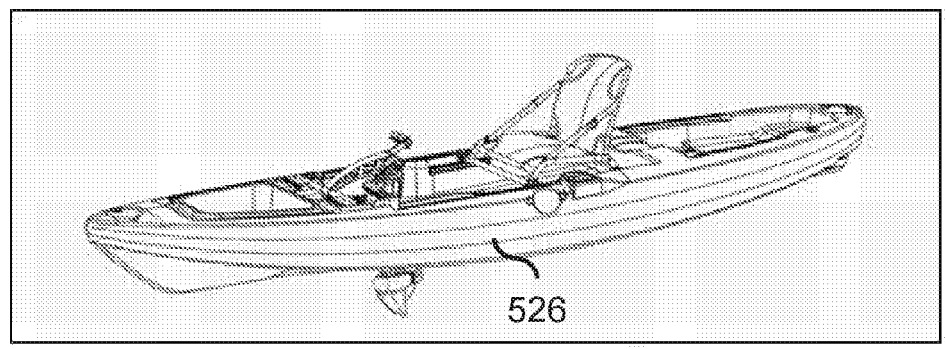
Figure 5R:
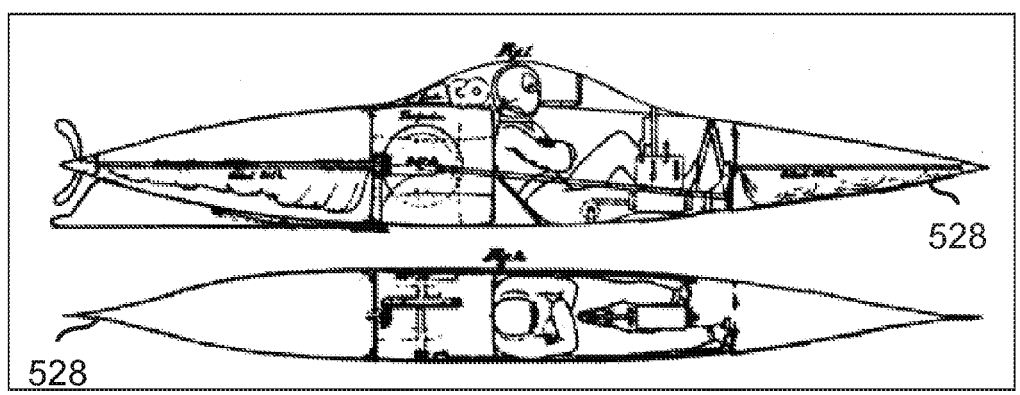

FIG. 1E depicts a side view of an example of the operation-switch assembly 104 of FIG. 1A. FIG. 1F depicts another side view of an example of the operation-switch assembly 104 of FIG. 1A. FIG. 1E depicts the operation-switch assembly 104 operating in the second propulsion-operation mode. FIG. 1F depicts the operation-switch assembly 104 operating in the first propulsion-operation mode.

In accordance with the example of FIGS. 1E and 1F, the following are depicted: the apparatus 100, the operation-switch assembly 104, the power-train assembly 106, the control assembly 203, the control-cable assembly 204, the engine 210, the wheel assembly 212, the first wheel assembly 304, the friction-gear assembly 214, the first friction gear 308, and the frame assembly 216.

In accordance with an option, in the first propulsion-operation mode, propulsion of the vehicle 102 is influenced by any one of: (A) an acceleration operation of the power-train assembly 106, and (B) a braking operation of the power-train assembly 106. The braking operation includes passive braking or dynamic breaking of the power-train assembly 106. The power-train assembly 106 provides inertia and retarding force that slows down the vehicle 102. The retarding force may be back EMF (electromotive force) provided by an electric motor and speed controller, and inertia provided by the rotating parts of a motor or in the case of a combustion engine, the pneumatic and/or hydraulic forces of the engine pistons. Active braking includes using a brake device (another device) configured to provide a brake function (other than the braking that may be provided by the power-train assembly 106).

FIG. 2A depicts a bottom view of an example of the apparatus 100 of FIG. 1A. In accordance with the example of FIG. 2A, the following are depicted: the apparatus 100, the vehicle 102, the operation-switch assembly 104, the power-train assembly 106, the controller signal cable 200, the control-cable assembly 204, the wheel assembly 212, the first wheel assembly 304, the second wheel assembly 306, the friction-gear assembly 214, the first friction gear 308, the second friction gear 310, the frame assembly 216, the platform 218, the front truck assembly 220, the front wheel 222, the battery-support assembly 224, a battery assembly 226, the electric-cable assembly 228, the control assembly 203, the speed controller 230, the controller-support assembly 232, and a self-retaining track-movement fixture 236. The platform 218 may be called a board. The battery-support assembly 224 may be called a plate. The controller-support assembly 232 may be called a plate. The self-retaining track-movement fixture 236 may be a pivotal-hinge device or linear-slider device.

In accordance with an option, the operation-switch assembly 104 includes a friction-gear assembly 214. The friction-gear assembly 214 is configured to operatively couple to the power-train assembly 106 in such a way that the power-train assembly 106 rotates the friction-gear assembly 214 once operated to do just so. In the first propulsion-operation mode, the friction-gear assembly 214 receives, at least in part, the power-train force from the power-train assembly 106 and transmits, at least in part, the power-train force in such a way that the power-train force influences propulsion of the vehicle 102. In the second propulsion-operation mode, the friction-gear assembly 214 is configured to receive, at least in part, the power-train force from the power-train assembly 106, and the friction-gear assembly 214 is also configured to not transmit the power-train force in such a way that the power-train force does not influence propulsion of the vehicle 102, and the friction-gear assembly 214 does not influence the vehicular momentum and the application of the non power-train force for propelling the vehicle 102.

FIG. 2B depicts a perspective view of an example of a control assembly 203 for use with the apparatus 100 of FIG. 2A and FIG. 1C. In accordance with the example of FIG. 2B, the following are depicted: the control assembly 203, the control-cable assembly 204, the lever support fixture 238, the controller lever 240, the controller handle bar 242, and the hand-control assembly 246.

FIGS. 3A to 3D depict side views of examples of a control assembly 203 for use with the apparatus 100 of FIG. 1A and FIG. 1C. In accordance with the examples of FIGS. 3A-3D, the following are depicted: the control assembly 203, the control-cable assembly 204, the lever support fixture 238, the controller lever 240, the controller handle bar 242, the hand-control assembly 246, and the joy-stick assembly 244.

Referring to FIGS. 3A and 3B, the position of the joy-stick assembly 244 is in the neutral position. Referring to FIGS. 3C and 3D the position of the joy-stick assembly 244 is the forward position or the reverse position (as may be desired).

FIG. 4A depicts a perspective view of another example of a control assembly 203 for use with the apparatus 100 of FIG. 1A. In accordance with the example of FIG. 4A, the following are depicted: the apparatus 100, the vehicle 102, the operation-switch assembly 104, the power-train assembly 106, the control-cable assembly 204, the wheel assembly 212, the first wheel assembly 304, the platform 218, the front truck assembly 220, the front wheel 222, the control assembly 203 and the foot-control assembly 248.

FIG. 4B depicts a side view of an example of the control assembly 203 of FIG. 4A. In accordance with the example of FIG. 4B, the following are depicted: the control assembly 203, the control-cable assembly 204, the foot-control assembly 248, the controller lever support fixture 250, and the foot-controller lever 252. FIG. 4B depicts an example of a foot-control assembly 248.

FIG. 4C depicts a perspective close-up view of an example of the control assembly 203 of FIG. 4A. In accordance with the example of FIG. 4C, the following are depicted: the control assembly 203, the wireless joy-stick device 254, the joy-stick assembly 256, and the controller handle 258. FIG. 4C depicts a schematic representation of a wireless joy-stick device 254. This type of control may be used with the foot-control assembly 248 of FIG. 4A. The wireless joy-stick device 254 may also be used with the systems of FIG. 3A to replace the control-cable assembly 204 if so desired.

FIGS. 5A to 5E depict views of examples of types of transportations systems adapted for used with the apparatus of FIG. 1A.

The vehicle 102 (also called a transportation system or a human-powered vehicle or a human-poweredcraft) includes any one of: a roller skate 500, a skateboard 502, a longboard 504, a kick scooter 506, a bicycle 508, a rickshaw 510, a side-by-side tandem cycle 512, a tricycle 514, a quadracycle 516, a tandem cycle 518, a peddle-driven car 520, a peddle-driven car 522, a peddle-driven aircraft 524 (front view, top view and side view depicted), a peddle-driven water craft 526 of the type usable above the water level (side view and perspective view depicted), and a peddle-driven water craft 528 of the type usable below water level (side view and top view depicted.

In view of all of the FIGS., by way of example, the apparatus 100 may include the power-train assembly 106 (and any equivalent thereof) that may include an electric motor and/or a combustion engine that provides torque (or force) to the driving wheel(s) of the vehicle 102. The combustion engine may be of the internal type or of the external type. The operation-switch assembly 104, any equivalent thereof, is attached to a drive shaft of the power-train assembly 106 in such a way as to transfer or separate power from the power-train assembly 106 to the wheel assembly 212 as well as to provide dynamic braking to the wheel assembly 212. The frame assembly 216 is configured to securely support the power-train assembly 106 and the operation-switch assembly 104. The power-train assembly 106 and the operation-switch assembly 104 are affixed to the vehicle 102. The speed controller 230, which may be called an electronic-speed controller (ESC), is used for the case where the electric motor is used (or is included) in the power-train assembly 106, or a throttle valve actuator for the case where the combustion engine is used as (or is included in) the power-train assembly 106. A hand-held controller is configured to generate an electric-control signal according to the user's command to control the speed (and torque) of the power-train assembly 106. The hand-held controller may operate either in a wired control mode and/or a wireless control mode. The control-cable assembly 204 includes a cable housed in a hollow tube and a control-cable assembly 204 is attached to the hand-control assembly 246 configured to control the disengagement position (as depicted in FIG. 1E) and the engagement position (as depicted in FIG. 1F) of the operation-switch assembly 104 so as to control the amount of torque transferred to the wheel assembly 212. The battery assembly 226 is provided such as batteries for the case where the electric motor is used as the power-train assembly 106, or fuel for the case where the combustion engine is used as (or is included in) the power-train assembly 106.

It will be appreciated that the operation of the foot-control assembly 248 may be similar to the operation of the hand-control assembly 246. Each of these devices may be controllable by wired control or by wireless control.

By way of example, in accordance with an example, the apparatus 100 operates in the following steps: (1) the power-train assembly 106 is started via a startup switch; (2) the cable is pulled via the controller lever 240 attached to the control-cable assembly 204 to engage the operation-switch assembly 104 to the wheel assembly 212; (3) the joy-stick assembly 244 is gradually increased from the neutral position of the hand-control assembly 246 to increase the speed of the power-train assembly 106 until the vehicle 102 starts moving and/or the vehicle 102 gets to (achieves) the desired speed; (4) to slow down the vehicle 102, the joy-stick assembly 244 is gradually returned to the neutral position; (5) the controller lever 240 is released to disengage the operation-switch assembly 104 from the wheel assembly 212 during cruising to allow free-wheeling operation of the vehicle 102 if so desired; (6) to brake the vehicle 102, the joy-stick assembly 244 is returned to the neutral position and the control-cable assembly 204 is pulled via the controller lever 240 simultaneously to reengage the operation-switch assembly 104 to the wheel assembly 212 to allow dynamic braking (if so desired).

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, components that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. An apparatus for a user and for a vehicle being configured to support the user, the apparatus comprising:
   an operation-switch assembly being configured to be supported by the vehicle, and the operation-switch assembly also being configured to switch propulsion operation of the vehicle between a first propulsion-operation mode and a second propulsion-operation mode;
   in the first propulsion-operation mode, the operation-switch assembly also being configured to permit propulsion of the vehicle to be influenced by a power-train assembly being configured to generate a power-train force; and
   in the second propulsion-operation mode, the operation-switch assembly also being configured to:
      permit propulsion of the vehicle to be influenced by a non power-train force; and
      permit propulsion of the vehicle to be not influenced by the power-train force of the power-train assembly; and
   a wheel assembly being configured to operatively couple to the vehicle in such a way that the wheel assembly transmits a torque force that facilitates rolling movement of the vehicle relative to a surface; and the operation-switch assembly including a friction-gear assembly being configured to operatively couple to the power-train assembly in such a way that the power-train assembly rotates the friction-gear assembly once operated; and wherein:

the wheel assembly includes:
  a first wheel assembly; and
  a second wheel assembly being spaced apart from the first wheel assembly; and the friction-gear assembly includes:
  a first friction gear; and
  a second friction gear being spaced apart from the first friction gear;
and
the power-train assembly includes:
  a first electric motor being configured to drive the first wheel assembly via the first friction gear; and
  a second electric motor being spaced apart from the first electric motor, and being configured to drive the second wheel assembly via the second friction gear.

2. The apparatus of claim 1, wherein:
in the second propulsion-operation mode, the operation-switch assembly is configured to not permit the power-train assembly to:
  increase propulsion of the vehicle; and
  decrease the propulsion of the vehicle.

3. The apparatus of claim 1, wherein:
the operation-switch assembly is also configured, in the first propulsion-operation mode, to engage the power-train assembly in such a way that propulsion of the vehicle is influenced by the power-train assembly; and
the operation-switch assembly is also configured, in the second propulsion-operation mode, to disengage the power-train assembly in such a way that propulsion of the vehicle is not influenced by the power-train force of the power-train assembly.

4. The apparatus of claim 1, wherein:
in the first propulsion-operation mode, the vehicle is propellable by application of the power-train force generated by the power-train assembly; and
in the second propulsion-operation mode, the vehicle is propellable by application of a user-motive force generated by the user.

5. The apparatus of claim 1, wherein:
in the first propulsion-operation mode, propulsion of the vehicle is influenced by any one of:
an acceleration operation of the power-train assembly; and
a braking operation of the power-train assembly.

6. The apparatus of claim 1, wherein:
in an acceleration operation of the power-train assembly, the power-train assembly is configured to apply any one of:
  a full application of the power-train force being configured to any one of increase and maintain propulsion of the vehicle; and
  a partial application of the power-train force being configured to any one of increase and maintain the propulsion of the vehicle.

7. The apparatus of claim 1, wherein:
in a braking operation of the power-train assembly, the power-train assembly is configured to apply a power-train braking force being configured to reduce the speed of the vehicle by application of any one of:
  a full application of the power-train braking force being configured to reduce the speed of the vehicle; and
  a partial application of the power-train braking force being configured to reduce the speed of the vehicle.

8. The apparatus of claim 1, wherein:
the operation-switch assembly is also configured in such a way that in the second propulsion-operation mode, the power-train force of the power-train assembly does not propel the vehicle, and the vehicle does not experience a retarding force from the power-train assembly so that the speed of the vehicle is not negatively impacted by the power-train assembly.

9. The apparatus of claim 1, wherein:
the operation-switch assembly is also configured in such a way that in the second propulsion-operation mode, the power-train force of the power-train assembly does not propel the vehicle but remains active and ready for immediate and available use on standby mode when required once the operation-switch assembly, in use, switches the operation of the vehicle to the first propulsion-operation mode.

10. The apparatus of claim 1, wherein:
the operation-switch assembly is also configured in such a way that the vehicle operates in the second propulsion-operation mode in which the vehicle is operated in any one case in which the vehicle:
is propelled in response to application of the non power-train force; and
maintains its vehicular momentum with a desired speed.

11. The apparatus of claim 1, wherein:
the operation-switch assembly is also configured in such a way that the vehicle operates in the first propulsion-operation mode in which the vehicle is propelled in response to application of the power-train force generated by the power-train assembly.

12. The apparatus of claim 1, wherein:
in the second propulsion-operation mode, the operation-switch assembly is also configured to permit the vehicle to freewheel; and
in the first propulsion-operation mode, the operation-switch assembly is also configured to permit the vehicle to not freewheel.

13. The apparatus of claim 1, wherein:
in the first propulsion-operation mode, the power-train assembly is operatively engaged with the wheel assembly in such a way that the vehicle is propelled in response to the power-train assembly transferring the power-train force to the wheel assembly, and the vehicle is propelled by the power-train force; and
in the second propulsion-operation mode, the power-train assembly is operatively disengaged from the wheel assembly in such a way that the power-train force is not received by the wheel assembly from the power-train assembly, and the vehicle is operated in any one case in which the vehicle is:
propelled by the non power-train force; and
maintained at a desired speed by way of vehicular momentum associated with the vehicle.

14. The apparatus of claim 1, wherein:
the operation-switch assembly includes:
  a control assembly being configured to actuate operation of the operation-switch assembly.

15. The apparatus of claim 1, wherein:
in the first propulsion-operation mode, the friction-gear assembly receives, at least in part, the power-train force from the power-train assembly and transmits, at least in part, the power-train force in such a way that the power-train force, in use, influences propulsion of the vehicle; and in the second propulsion-operation mode, the friction-gear assembly is configured to receive, at least in part, the power-train force from the power-train assembly, and the friction-gear assembly is also configured to not transmit the power-train force in such a way that the power-train force does not influence propulsion of the vehicle, and the friction-gear assembly does not influence vehicular momentum and the application of the non power-train force for propelling the vehicle.

16. The apparatus of claim 1, wherein:
a frame assembly being configured to operatively support rotation of the friction-gear assembly, and the frame assembly being configured to switchably move the friction-gear assembly between the first propulsion-operation mode and the second propulsion-operation mode; and
a control assembly being configured to couple to the frame assembly, and the control assembly also being configured to actuate movement of the frame assembly in such a way that:
  in the second propulsion-operation mode, the friction-gear assembly does not operatively transmit the power-train force from the power-train assembly; and
  in the first propulsion-operation mode, the friction-gear assembly operatively transmits the power-train force from the power-train assembly.

* * * * *